(12) United States Patent
Widenbrant et al.

(10) Patent No.: US 12,409,631 B2
(45) Date of Patent: Sep. 9, 2025

(54) MULTILAYER FILM WITH INTEGRALLY FORMED LINER

(71) Applicant: 3M INNOVATIVE PROPERTIES COMPANY, St. Paul, MN (US)

(72) Inventors: Martin Johan Olof Widenbrant, Stillwater, MN (US); Jeffrey O. Emslander, Grant, MN (US); Kevin T. Huseby, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 17/633,235

(22) PCT Filed: Jul. 30, 2020

(86) PCT No.: PCT/IB2020/057192
§ 371 (c)(1),
(2) Date: Feb. 7, 2022

(87) PCT Pub. No.: WO2021/024109
PCT Pub. Date: Feb. 11, 2021

(65) Prior Publication Data
US 2022/0355572 A1   Nov. 10, 2022

Related U.S. Application Data

(60) Provisional application No. 62/882,083, filed on Aug. 2, 2019.

(51) Int. Cl.
*B32B 7/06* (2019.01)
*B29C 48/00* (2019.01)
(Continued)

(52) U.S. Cl.
CPC .............. *B32B 7/06* (2013.01); *B32B 7/12* (2013.01); *B29C 48/0018* (2019.02);
(Continued)

(58) Field of Classification Search
CPC .. B32B 7/06; B32B 7/12; B32B 27/08; B32B 2250/03; B32B 2250/04; B32B 2250/05;
(Continued)

(56) References Cited

U.S. PATENT DOCUMENTS

| | | | |
|---|---|---|---|
| 7,927,679 B2 * | 4/2011 | Cruz | B32B 27/36 428/355 R |
| 2005/0003155 A1 * | 1/2005 | Huffer | B32B 3/26 428/141 |
| 2011/0316203 A1 * | 12/2011 | Emslander | B32B 25/14 264/494 |

FOREIGN PATENT DOCUMENTS

| | | |
|---|---|---|
| EP | 1775122 | 4/2007 |
| EP | 2246402 B1 | 8/2013 |

(Continued)

OTHER PUBLICATIONS

Machine Translation of JP 2001-310365. (Year: 2001).*
(Continued)

*Primary Examiner* — Patricia L. Nordmeyer
(74) *Attorney, Agent, or Firm* — Katherine M. Scholz

(57) ABSTRACT

A multilayer film having a backing with an integrally formed polymeric liner, made in a common coextrusion process. The polymeric liner has material properties deemed to make it incompatible with the backing material, resulting in two layers that resist separation during manufacture and transportation but are hand separable in field applications and installation.

13 Claims, 4 Drawing Sheets

(51) Int. Cl.
  *B29C 48/21* (2019.01)
  *B32B 7/12* (2006.01)
  *B29K 23/00* (2006.01)
  *B29K 67/00* (2006.01)
  *B29K 105/00* (2006.01)

(52) U.S. Cl.
  CPC ...... *B29C 48/21* (2019.02); *B29K 2023/0625* (2013.01); *B29K 2023/065* (2013.01); *B29K 2023/083* (2013.01); *B29K 2067/003* (2013.01); *B29K 2067/046* (2013.01); *B29K 2105/0097* (2013.01)

(58) Field of Classification Search
  CPC .......... B32B 2250/24; B32B 2307/748; B32B 2405/00; B29C 48/0018; B29C 48/21; B29C 48/023; B29C 48/08; B29C 48/22; B29C 48/10; B29K 2023/0625; B29K 2023/065; B29K 2023/083; B29K 2067/003; B29K 2067/046; B29K 2105/0097

See application file for complete search history.

(56) References Cited

FOREIGN PATENT DOCUMENTS

| | | | |
|---|---|---|---|
| JP | 2001310365 | 4/2000 | |
| WO | WO-2011054859 A1 * | 5/2011 | ............. B32B 27/08 |
| WO | 2014197368 A1 | 12/2014 | |

OTHER PUBLICATIONS

Machine Translation of WO-2011054859-A1. (Year: 2011).*
European Application No. 20851153 Supplementary Search Report dated Jun. 30, 2023, 2 pages.

* cited by examiner

MULTILAYER FILM WITH INTEGRALLY FORMED LINER

BACKGROUND

A release liner is a paper or plastic-based film sheet used to prevent a sticky surface from prematurely adhering to another surface. Release liners may aid in the transportation or application of various adhesive-coated products and are removed at various stages of manufacturing or field use, then typically discarded or recycled.

Release liners are typically discrete rolls of pre-formed product upon which a further product is manufactured, or to which a semi-finished or finished product is laminated. This means that separate liner handling machinery and process controls are needed.

SUMMARY

A polymeric backing with an integrally formed release liner. The backing and the release liner are co-extruded during a common manufacturing process, and the materials selected for each provide a natural affinity and attraction to each other, without the use of adhesives or tie layers (though adhesives or tie layers may be additionally added). The liner is removable in the field by forces applied by an applicator. The side of the backing opposite the release liner may include further layers, for example, layers of pressure sensitive adhesive.

In one embodiment, a multilayer polymeric film is described, the film comprising, in the following order: a polymeric liner; a polymeric backing; an adhesive layer; wherein the first and second polymer layers are co-extruded in a common manufacturing process, and wherein polymeric liner and polymeric backing are incompatible with each other.

In a further embodiment, a method of making a multilayer film is described, the method comprising, as part of a common manufacturing process, co-extruding a polymeric backing film layer adjacent to a polymeric liner film layer; wherein the polymeric backing film layer and the polymeric liner film layer are incompatible with one another.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

For some tape applications it may be desirable to include a liner that acts as an application aid disposed on the polymer surface opposite that of the pressure sensitive adhesive coated film, where the interfacial adhesion between the release liner and the film backing of the pressure sensitive adhesive coated film is controlled so that the release liner can be stripped from the film backing after application to the desired substrate. This is particularly useful in applications where adhesive-coated tapes must be overlapped with themselves, that is, the sticky side of a tape must provide high levels of adhesion to its own exposed surface of its backing (the side opposite the sticky side) in an effectively permanent manner (depending on application), yet be delivered on a roll—that is, the adhesive side must be easily separable during unwinding from the roll, yet must be capable of permanent or semi-permanent bonding to itself when overlapped during installations.

Figure 1:
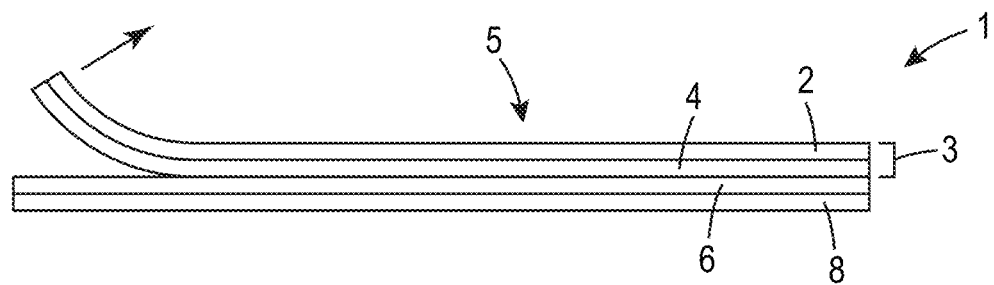
FIG. 1 is a drawing of a prior art film construction including a traditional release liner.

One such application area is flashing tapes used in commercial and residential building construction, which are used for example for sealing gaps and air egress/ingress routes around building structures, such as windows and doors. These tapes are ideally delivered for field application on a roll, yet when overlapped they must provide high levels of adhesion to the surface opposite the adhesive side of the tape. To facilitate this use case, a release liner is coupled to an adhesive-backed film, as is shown in FIG. 1. FIG. 1 shows a prior art tape construction 1 comprising a backing 6 having a pressure sensitive adhesive layer 8 disposed on a major surface thereof. Release liner 3 is applied to the backing surface opposite adhesive layer 8, and typically comprises a low cost, thin polymer film 2 and a light adhesive coating 4, which is selected to keep polymer film 2 coupled to backing 6 during transportation and installation, but is field removable by a worker as part of an installation process. Polymer film 2 may additionally include release agents of types known in the art, applied on the upper surface 5 of polymer film 2.

The release liner 3 may also facilitate manufacturing and slitting of the tape product, and in these operations the separation force to effect separating the release liner and the backing needs to be greater than the unwind force of the roll. The separation force also needs to be great enough to withstand storage and transportation without separating.

After application to a desired substrate the release liner can be removed in the field, by hand, to facilitate a high re-adhesion force (that is, adhesion to self at overlaps). In addition, the release liner makes it possible for product engineers to dictate a particular desired unwind force for a roll of adhesive tape that is decoupled from the re-adhesion or overlap adhesion force. For example a low unwind force can be implemented for the separation of the release liner from the pressure sensitive adhesive on a roll, while also providing a high re-adhesion force onto the revealed top surface that has been applied to the substrate (or overlapped). This is advantageous for use in flashing tapes and self-adhered air barrier membranes.

Release liners of the prior art are typically coupled to the backing/adhesive stack as a distinct step after manufacturing, or in some cases the backing/adhesive stack may be manufactured upon a liner. In either case, such release liners must be handled separately from the adhesive-coated tapes during some steps of the manufacturing process, which adds cost and manufacturing complexity to tapes of the prior art requiring such liners.

Now, a new process and product has been discovered in which a backing is integrally formed with a liner. By "integrally" it is meant that the two layers are co-extruded as part of a common extrusion process. In a preferred embodiment, the two layers are adjacent one another, with no intervening layers. By "backing" it is meant any suitable single or multi-layer film-based product, with potentially one or many intervening layers. Further adhesive layers, release layers, or tie layers, for example, could be extruded in the same extrusion process also, depending on the application. Further, it has been discovered that, if the materials used for the backing and the integrally formed liner are selected properly, it may not be necessary (though it is possible and contemplated within the scope of this disclosure) to have an additional adhesive layer or tie layer sandwiched between these two layers. Instead, and surprisingly, a natural bond develops during the manufacturing process. This natural bond between a backing and an integrally formed liner may be high enough such that the release liner stays coupled to the backing through manufacturing, conversion, and transportation, yet may be removed in the field by a worker using the underlying tape, at the time of use, through manual application of a relatively low peel-off force (that is, a worker pulls the backing off using his hands).

The coextrusion process used for making the backing with integrally formed release liner of coextrusion of the present invention in some embodiments is more economical and efficient than the prior art two-step process in which the release liner is applied to a finished substrate.

The backing with integrally formed release liner can be formed using any suitable polymer material for the liner that has sufficient adherence (with or without additional added adhesive) to the film so that the integrally formed liner will remain in place until it is removed manually or mechanically. While the focus of aspects of this disclosure is on a simplified two-layer construction, as shown in FIG. 2 and discussed below, it will be appreciated that any number of further layers cold be included in a polymeric film manufactured according to the principles set forth herein.

Figure 2:
FIG. 2 is a drawing of a backing with an integrally formed release liner.

FIG. 2 shows film 100 having a backing with integrally formed liner according to one embodiment of the present disclosure. Backing 20 has been coextruded with liner 40 using a process described below. Backing comprises a material that is incompatible with liner 40 (discussed below). In one embodiment shown in FIG. 2, there is no intervening adhesive layer between the backing 20 and release liner 40. In other embodiments, there are further, intervening adhesive or tie layers. Film 100 is a polymeric film having 1, 2, 3, 4, 5, or even at least 6 polymeric or adhesive layers.

Backing 20 may comprise any suitable material such as, for example, polyesters, polyesters such as copolyesters (for example, Eastar GN071, Eastman copolyester 14285 both from Eastman Chemical), polymethylmethacrylates, polyurethanes and, in some embodiments, polyesters such as polylactic acid polymers (for example, Ingeo Biopolymer 4060D from Natureworks, LLC)

Release liner 40 may comprises any suitable material such as, for example, polyolefins and, in some embodiments, low melting and low crystallinity polyolefins such as copolymers of syndiotactic polypropylene (for example, FINAPLAS 1571 from Total Petrochemical, LDPE 611A from Dow), copolymers of propylene and ethylene (for example, PP8650 from Total Petrochemical), or ethylene octene copolymers (for example, AFFINITY PT 1451 from Dow), or more crystalline polyolefins such as high density polyethylene (for example CGDC-2100 from Dow).

Furthermore, the release liner may comprise mixtures of polyolefin materials known in the art. Other materials suitable for use in the strippable release liner(s) include, for example, fluoropolymers such as polyvinylidene fluoride (PVDF), ethylene-tetrafluoroethylene fluoropolymers (ETFE), polytetrafluoroethylene (PTFE), copolymers of PMMA (or a coPMMA) and PVDF, or any of the THV or PFA materials available from 3M (St. Paul, Minn.). Processing aids such as DYNAMAR (available from 3M, St. Paul, MN) or GLYCOLUBE (available from Lonza Corporation in Fair Lawn, N.J.) may enhance release characteristics of strippable release liners. Additional materials suitable for use in the strippable release liner(s) generally include polyolefins, such as polypropylene and modified polypropylenes. Aliphatic polyolefins can also be used. One suitable group of polypropylenes includes high density polypropylenes which exhibit particularly low adhesion to polyester, polylactic acid, polyurethanes and acrylic materials. Polyethylene and their copolymers also may be useful, including copolymers and propylene and ethylene. Other exemplary materials include polymethylpentene, cyclic olefin copolymers such as TOPAS available from Ticona Engineering Polymers (Florence, Ky.), copolymers of olefins with maleic anhydride, acrylic acid, or glycidyl methacrylate, or any of the HYTREL (thermoplastic polyester elastomer).

Syndiotactic and atactic vinyl aromatic polymers, which may be useful in some embodiments of the present disclosure, include poly(styrene), poly(alkyl styrene), poly(styrene halide), poly(alkyl styrene), poly(vinyl ester benzoate), and these hydrogenated polymers and mixtures, or copolymers containing these structural units. Examples of poly (alkyl styrenes) include: poly(methyl styrene), poly(ethyl styrene), poly(propyl styrene), poly(butyl styrene), poly (phenyl styrene), poly(vinyl naphthalene), poly(vinylstyrene), and poly(acenaphthalene) may be mentioned. As for the poly(styrene halides), examples include: poly(chlorostyrene), poly(bromostyrene), and poly(fluorostyrene). Examples of poly(alkoxy styrene) include: poly(methoxy styrene), and poly(ethoxy styrene). Among these examples, as particularly preferable styrene group polymers, are: polystyrene, poly(p-methyl styrene), poly(m-methyl styrene), poly(p-tertiary butyl styrene), poly(p-chlorostyrene), poly (m-chloro styrene), poly(p-fluoro styrene), and copolymers of styrene and p-methyl styrene may be mentioned. Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

Aliphatic copolyesters and aliphatic polyamides may also be useful materials for strippable layers. As for polyester polymers and copolymers, the diacids can be chosen from terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid), and any of the isomeric dicarboxylic acids of the fused-ring aromatic hydrocarbons (such as indene, anthracene, pheneanthrene, benzonapthene, fluorene and the like). Alternatively, alkyl esters of these monomers, such as dimethyl terephthalate, may be used.

Potentially suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4' dihydroxymethyl biphenyl and its isomers, and 1,3-bis(2-hydroxyethoxy)benzene and its isomers), and lower alkyl ethers or diethers of these diols, such as dimethyl or diethyl diols.

In some embodiments, the integrally formed liner is a rough strippable release liner or layers. The rough strippable release liner can assist in forming a rough skin layer surface as described above. It has been found that these and related goals can be accomplished by careful selection of the materials for making the continuous phase and the disperse phase and ensuring their compatibility with at least some of the materials used to make the film. In some embodiments, the continuous phase of the rough strippable release liner have low crystallinity or are sufficiently amorphous in order to remain adhered to the film for a desired period of time.

Materials suitable for use in the continuous phase of the integrally formed liner include, for example, polyolefins, such as low melting and low crystallinity polypropylenes and their copolymers; low melting and low crystallinity polyethylenes and their copolymers, low melting and low crystallinity polyesters and their copolymers, or any suitable combination thereof. Such low melting and low crystallinity polypropylenes and their copolymers consist of propylene homopolymers and copolymers of propylene and ethylene or alpha-olefin materials having between 4 to 10 carbon atoms. The term "copolymer" includes not only the copolymer, but also terpolymers and polymers of four or more component polymers. Suitable low melting and low crystallinity polypropylenes and their copolymers include, for example, syndiotactic polypropylene (such as, FINAPLAS 1571 from Total Petrochemicals, Inc.), which is a random copolymer with an extremely low ethylene content in the syndiotactic polypropylene backbone, and random copolymers of propylene (such as PP8650 or PP6671 from Total Petrochemical, which is now Total Petrochemicals, Inc.). The described copolymers of propylene and ethylene can also be extrusion blended with homopolymers of polypropylene to provide a higher melting point release liner if needed. Colorants may also be added to the liner 40, helping a user easily identify whether the liner is present and providing visual indicia of removal.

Other suitable low melting and low crystallinity polyethylenes and polyethylene copolymers include, for example, linear low density polyethylene and ethylene vinyl alcohol copolymers. Suitable polypropylenes include, for example, random copolymers of propylene and ethylene (for example, PP8650 from Total Petrochemicals, Inc.), or ethylene octene copolymers (for example, AFFINITY PT 1451 from Dow Chemical Company). In some embodiments, the continuous phase includes an amorphous polyolefin, such as an amorphous polypropylene, amorphous polyethylene, an amorphous polyester, or any suitable combination thereof or with other materials. In some embodiments, the materials of the rough strippable release liners can include nucleating agents, such as sodium benzoate to control the rate of crystallization. Additionally, anti-static materials, anti-block materials, coloring agents such as pigments and dyes, stabilizers, and other processing aids may be added to the continuous phase. Additionally or alternatively, the continuous phase of the rough strippable release liners may include any other appropriate material.

In many embodiments, the degree of adhesion of the rough release liner to an adjacent surface of the film, as well as the degree of surface roughness, can be adjusted to fall within a desired range by blending in more crystalline or less crystalline materials, more adhesive or less adhesive materials, or by promoting the formation of crystals in one or more of the materials through subsequent processing steps. In some exemplary embodiments, two or more different materials with different adhesions can be used as co-continuous phases included into the continuous phase of the rough strippable release liner. For example, a material with relatively high crystallinity, such as high density polyethylene (HDPE) or polycaprolactone, can be blended into the rough strippable release liners in order to impart rough texture into the surface of the film layer that is adjacent to the rough strippable release liner and to affect adhesion. Nucleating agents can also be blended into the rough strippable release liners in order to adjust the rate of crystallization of one or more of the phases in the strippable skin composition. In some exemplary embodiments, pigments, dyes or other coloring agents can be added to the materials of the rough strippable skins for improved visibility of the skin layers.

The degree of surface roughness of the rough release liners can be adjusted similarly by mixing or blending different materials, for example, polymeric materials, inorganic materials, or both into the disperse phase. In addition, the ratio of disperse phase to continuous phase can be adjusted to control the degree of surface roughness and adhesion and will depend on the particular materials used. Thus, one, two or more polymers would function as the continuous phase, while one, two or more materials, which may or may not be polymeric, would provide a disperse phase with a suitable surface roughness for imparting a surface texture. The one or more polymers of the continuous phase can be selected to provide a desired adhesion to the material of the polyacrylate blend skin layer. For example, HDPE could be blended into low crystallinity syndiotactic polypropylene (sPP) for improving surface roughness along with a low crystallinity poly(ethylene octene) (PE-PO) for improving strippable skin adhesion.

In some embodiments, when the integrally formed release liner is peeled away from the backing, there will be no remaining residual material from the strippable release liner (or any associated adhesive, if used and properly selected). In some embodiments, the integrally formed release liner has a thickness of at least 12 microns. Optionally, the strippable release liner includes a dye, pigment, or other coloring material so that it is easy to observe whether the strippable release liner is on the film or not. Such visual indicia may thus facilitate proper use of the film in the field.

Other materials can be blended into the integrally formed release liner or backing to improve adhesion of the release liner 40 to backing 20. Modified polyolefins containing vinyl acetate or maleic anhydride may be particularly useful for improving adhesion of the integrally formed release liners to the backing. Furthermore polymers containing acid/acrylate-modified ethylene vinyl acetate polymers (for example Bynel 3101, from DuPont) or ethylene acrylate polymers (for example Byne 22E780, from DuPont) may be well suited to improve adhesion between the release liner and the film. Using such materials (or not using them) allows formulators to dial in precise levels of adhesion between the integrally formed release liner and the backing layer.

In some exemplary embodiments, the materials of the integrally formed release liner may be selected so that the adhesion of the release liner to the film is characterized by a peel force of at least 2 g/in or more, or characterized by a peel force of a 4, 5, 10 or 15 g/in or more. In some exemplary embodiments, the film and release liner construction can be characterized by a peel force as high as 100 g/in or even 120 g/in. In other exemplary embodiments, the film and release liner construction can be characterized by a peel force of 50, 35, 30 or 25 g/in or less. In some exemplary implementations the adhesion can be in the range from 2 g/in to 120 g/in, from 4 g/in to 50 g/in, from 5 g/in to 35 g/in, or from 15 g/in to 25 g/in. In other exemplary embodiments, the adhesion can be within other suitable ranges. Peel forces over 120 g/in can be tolerated for some applications.

The peel force that can be used to characterize exemplary embodiments of the present disclosure can be measured as follows. In particular, the present test method provides a procedure for measuring the peel force needed to remove an integrally formed release liner from the backing. Test-strips of material are cut from film stack made according to the process described below, with the integrally formed release liner adhered to the film. Strips are cut to about 1 inch width, and at least about 6" in length. The strips may be pre-conditioned for environmental aging characteristics (for example hot, hot & humid, cold, thermal-shock) as needed based on intended application. Typically, the samples should dwell for more than about 24 hours in the testing environment prior to testing. The 1 inch strips are then applied to stainless steel panels (standard stainless steel test panels available from Cheminstruments, Fairfield, Ohio), using double-sided tape (such as Scotch™ double sided tape available from 3M) between the backing layer 20 opposite the integrally formed release liner and the stainless steel test panel, thereby securing the plate and test piece on the peel-tester platen. The leading edge of the strippable release liner is then separated from the film and clamped to a fixture connected to the peel-tester load-cell. The platen holding the plate/test-strip assembly is then carried away from the load-cell at constant speed of about 90 inches/minute, effectively peeling the strippable release liner from the substrate film at about a 180-degree angle. As the platen moves away from the clamp, the force required to peel the strippable release liner off the film is sensed by a load cell and recorded by a microprocessor. The force required for peel is then averaged over 5 seconds of steady-state travel (preferably ignoring any initial shock associated with the starting the peel) and recorded.

Figure 3:
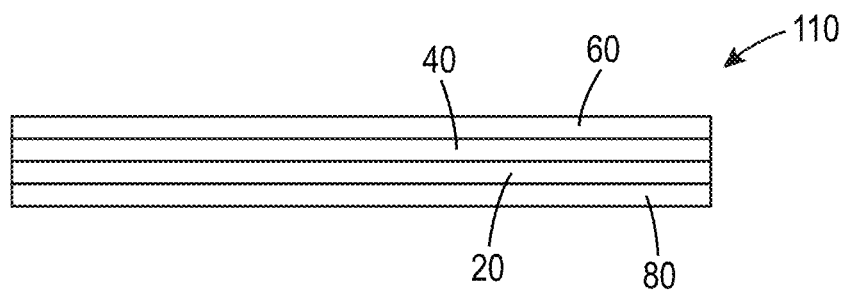
FIG. 3 is a drawing of a backing with an integrally formed release liner and an additional adhesive layer.

FIG. 3 is a drawing of film construction 110 having a backing 20 with integrally formed release liner 40, as has been described with respect to FIG. 2. However, in the embodiment shown in FIG. 3, the construction additionally includes a layer of adhesive 80 on the side of the backing opposite the integrally formed release liner, as well as a release agent, such as a layer of silicone, on the major side of the integrally formed release liner opposite the backing. Exemplary release agents include at least one of an alkyl dimethicone, a polyvinyl octadecyl carbamate, or an ethylene bis-stearamide. Alkyl dimethicones, are described, for example, in U.S. Pat. No. 9,187,678 (Boardman et al.). A polyvinyl octadecyl carbamate is commercially available, for example, under the trade designation "ESCOAT P-77" (a polyvinyl octadecyl carbamate in a linear, low density carrier resin) from Mayzo, Inc., Suwanee, GA. An ethylene bis-stearamide is available, for example, under the trade designation "AMPACET 100666" from Ampacet Corporation, Tarrytown, NY. Pressure sensitive adhesive tapes, or adhesive tapes, are often provided in roll form, wherein the tape construction includes a backing, an adhesive layer on one major side of the backing, and a release layer on the other major side of the backing. The release layer allows the tape to be unwound from the roll at a controlled adhesion force level. Other articles having release characteristics are employed in a variety of applications. Any adhesive coated article, including tapes, die-cut adhesive articles, and labels, require, as a matter of practicality, a release coating or a separate release liner. The release coating or liner provides a surface to which the article does not permanently adhere.

A construction similar to that shown in FIG. 3 may be particularly well suited for flashing tape applications used in building (residential, commercial) building trades to seal around windows, doors, and other openings before siding is applied. For example, in a flashing tape application the liner component in one embodiment comprises a polyethylene liner, having its exposed (upper) major surface coated with a release coating such as one based on silicone (as corresponding to layers 40 (release layer) and 60 (liner film) in the embodiment shown in FIG. 3). The co-extruded backing (corresponding to layer 20) would comprise: one or more layers of PLA, including other polymer additives as needed to strengthen the construction; an elastomer layers of a suitable elastomer such as Krayton, allow penetrations (e.g., by nail or screw) going through the tape to be self-sealing; and one or more layers of high density polyethylene to reduce water vapor transmission. Finally, adhesive layer 80 comprises a suitable pressure sensitive adhesive. Further layers may also be possible. The liner layer in this construction is integrally formed with the backing layer: the polyethylene (liner) and the upper major surface of the PLA layer of the backing interfacing and giving rise to a resistance to separability that is subject to aspects of this disclosure discussed above and below. The liner may be removed in the field by hand. The release liner on the upper surface of the liner allows the entire construction to be placed in a roll configuration, then in the field a worker may unroll the tape and apply it, remove the liner, and then achieve very high levels of effectively permanent adhesion when the tape is overlapped with its self (in other words, the PSA that is layer 80 has a high affinity to adhere to the composition of the major surface of the backing that is exposed upon removal of the liner).

Each of the layers shown in the embodiment shown in FIG. 3 may comprise in particular embodiments further layers with separate compositions, or further adhesive layers, and each layer may have further intervening layers as needed for the application. The embodiments show in in FIG. 3 may be useful as a self-wound material, such as a flashing tape, sold on a roll to a customer. The interfacial adherence between the exposed major side of adhesive layer 80 and release layer 60 is lower than the interfacial adherence between the backing and the integrally formed liner, thus allowing the tape to be unrolled and applied without removing the integrally formed liner. Then, once applied, the integrally formed liner may be removed (along with whatever further layers such as the release layer), exposing the side of the backing 20 opposite the adhesive layer 80. This may be useful when adhesive layer 80 is intended to form an aggressive bond with backing 20 when overlapped in field applications.

In some embodiments, at least one layer of a polymeric film described herein comprises an ultraviolet (UV) absorber. A UV absorbing layer (e.g., a UV protective layer) can aid in protecting other layers or substrates from UV-light caused damage/degradation over time by absorbing UV-light (in some embodiments, any UV-light).

In some embodiments, the UV absorbers are red shifted UV absorbers (RUVA) that absorb at least 70% (in some embodiments, at least 80%, or even at least 90%) of the UV light in the wavelength region from 180 nm to 400 nm. Typically, it is desirable that the RUVA be highly soluble in polymers, highly absorptive, photo-permanent, and thermally stable in at least the temperature range from 200° C. to 300° C. for the extrusion process to form the protective layer. In some embodiments, a RUVA is copolymerizable with monomers to form a protective coating layer by at least one of free radical initiator curing, UV curing, gamma ray curing, e-beam curing, or thermal curing processes. Exemplary UVAs are UVA oligomers as described, for example, in PCT Pub. Nos. WO2014/10055A1 (Olson et. al.), WO2014/100580A1 (Olson et. al.), WO 2015/200655 (Olson et. al.), WO 2015/200669 (Olson et. al.), and WO 2015/200657 (Olson et. al.), the disclosure of which are incorporated herein by reference.

RUVAs typically have enhanced spectral coverage in the long-wave UV region (i.e., 300 nm to 400 nm), enabling them to block the high wavelength UV light that can cause yellowing in most polymers. Typical UV protective layers have thicknesses in a range from about 13 micrometers to 380 micrometers with a RUVA loading level in a range from about 2-10% by weight. Exemplary RUVAs include benzotriazole compound, 5-trifluoromethyl-2-(2-hydroxy-3-alpha-cumyl-5-tert-octylphenyl)-2H-benzotriazole (available under the trade designation "CGL-0139" from BASF Corporation, Florham, NJ), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6-diphenyl-1-3,5-triazin-2-yl)-5-hexyloxy-phenol. Additional commercially available RUVAs include those available from BASF Corporation under the trade designations "TINUVIN 1577," "TINUVIN 1600," and "TINUVIN 777." Other exemplary UV absorbers are available, for example, in a polymethylmethacrylate (PMMA) UVA masterbatch from Sukano Polymers Corporation, Duncan, SC, under the trade designations "TA11-10 MB03."

In some embodiments, at least one layer of a polymeric multilayer film described herein comprises a hindered amine light stabilizer (HALS). Exemplary HALS include those available from BASF Corporation under the trade designations "CHIMASSORB 944" and "TINUVIN 123." Another exemplary HALS is available, for example, from BASF Corp., under the trade designation "TINUVIN 944."

In some embodiments, at least one layer of a polymeric multilayer film described herein comprises an antioxidant. Exemplary antioxidants include those available under the trade designations "IRGANOX 1010" and "ULTRANOX 626" from BASF Corporation.

In some embodiments, at least one layer of a polymeric multilayer film described herein comprises an antioxidant. Antioxidants can reduce or prevent degradation of the color development, and the physical and mechanical properties of the polymeric multilayer film. Exemplary antioxidant materials include those commercially available, for example, under the trade designations "CYANOX 1790" and "CYANOX 2777" from Cytec Solvay Group, Woodland Park, NJ.

In some embodiments, at least one layer of a polymeric film described herein comprises at least one of a slip additive or blocking agent. Slip additives can modify the surface properties of a film, lowering the friction between film layers and other surfaces. To be effective, the slip additive needs to migrate out of the polymer to the surface and therefore, it needs to have a degree of incompatibility with the polymer.

Exemplary slip additives include fatty acid amides such as erucamide or oleamide. During processing, slip additives solubilize in the amorphous melt, but as the polymer cools and crystallizes, the fatty acid, amide is "squeezed" out, forming a lubricating layer at the polymer surface. The addition of a slip additive can reduce or prevent film sticking and pulling, helping to increase throughput. Exemplary slip additives are commercially available, for example, under the trade designations "AMPACET 100497" (a masterbatch containing 1% erucamide, in low density polyethylene carrier resin); and "#10358" (a masterbatch of 5% oleamide, in a polyethylene carrier) from Ampacet Corporation, Tarrytown, NY.

Blocking is a phenomenon observed where two similar formed films placed in intimate contact form an adhesion such that they become inseparable. A blocking agent can reduce or prevent blocking of layers of extruded film. Polyolefin and other plastic films have a tendency to block together, often making it difficult to separate layers. This blocking is an inherent property of some polymers. Anti-blocking additives can be added to the resin before extrusion to minimize the blocking force between layers. Once compounded into a plastic, these additives create a microrough surface, which reduces the adhesion between film layers and lowers the blocking tendency. Exemplary anti-block agents are typically inorganic materials such as diatomaceous earth, talc, calcium carbonate, clay, mica and ceramic spheres. An exemplary anti-block agent is commercially available, for example, under the trade designations "ABC5000" from Polyfil Corporation, Rockaway, NJ; and "AMPACET 102077" from Ampacet Corp.

In some embodiments, at least one layer of a polymeric multilayer film described herein comprises an abrasion resistant material. Abrasion resistant materials may be added to reduce scratching, marring and abrasion of the finished product. An exemplary abrasion resistant additive is commercially available, for example, under the trade designation "MB25-381" (a masterbatch containing a siloxane polymer) from Dow Corning, Auburn, MI.

In some embodiments, at least one layer of a polymeric multilayer film described herein comprises at least one of a dye or pigment (e.g., imparting a color such as white, yellow, green, blue, red, orange, brown, black, etc.). Exemplary dyes include those commercially available, for example, under the trade designation "CLARIANT REMAFIN PE63421213-ZN" (a green dye masterbatch) from Clariant International AG, Muttenz, Switzerland. Exemplary pigments include titanium dioxide, zinc oxide, and zirconium dioxide. An exemplary pigment, a commercially available masterbatch of titanium dioxide pigment in a polyolefin carrier, is sold under the trade designation "#11937" from Standridge Color Corporation, Social Circle, GA.

In some embodiments, at least one layer of a polymeric multilayer film described herein comprises at least one of an ink or paint receptive material. Ink receptive materials can be desirable for adding an informational or decorative element to a film to improve the functionality or aesthetics of the film. Exemplary receptive materials include, for example, ethylene/vinyl acetate/carbon monoxide terpolymer, as described, for example, in U.S. Pat. No. 6,316,120 (Emslander), the disclosure of which is incorporated herein by reference.

In some embodiments, at least one layer of a polymeric multilayer film described herein comprises metallic (e.g., aluminum, bronze, stainless steel, zinc, iron, tin, silver, gold, and/or titanium) particles. Metallic particles can provide unique decorative aspects, such as sparkle or pearlescence to films. An exemplary metallic particle additive is commercially available, for example, under the trade designation "PELLEX A240-50" (a metallic glitter masterbatch) from The Cary Company, Addison, IL. In some embodiments, at least one layer exhibiting a random network of strands and connective regions is separable from the remaining polymeric multilayer film.

In some embodiments, at least one layer of a polymeric multilayer film described herein, including a layer exhibiting a random network of strands and connective regions, comprises an adhesive (including pressure sensitive adhesives).

In some embodiments, at least one layer exhibiting a random network of strands and connective regions, comprises a pressure sensitive adhesive. Exemplary pressure sensitive adhesives include those available, for example, under the trade designations "OCA8171" and "OCA8172" from 3M Company, St. Paul, MN. Extrudable pressure sensitive adhesives are commercially available, for example, under the trade designations "LIR-290," "LA2330," "LA2250," "LA2140E," and "LA1114" from Kuraray, Osaka, Japan; and "ESCORE" from Exxon Mobil, Irving, TX. The tackiness of pressure sensitive adhesives can be adjusted, for example, with tackifiers.

Other exemplary adhesives include isobutylene/isoprene copolymers available, for example, under the trade designations "EXXON BUTYL 065," "EXXON BUTYL 068," and "EXXON BUTYL 268" (believed to have unsaturation in the range of about 1.05 to about 2.30 mole percent) from Exxon Mobil Corp.; "BK-1675N" (believed to have unsaturation of about 1.7 mole percent) from United Chemical Products, Velizy-Villacoublay, France; "LANXESS BUTYL 301" (believed to have unsaturation of about 1.85 mole percent), "LANXESS BUTYL 101-3" (believed to have unsaturation of about 1.75 mole percent), and "LANXESS BUTYL 402" (believed to have unsaturation of about 2.25 mole percent) from Lanxess, Sarnia, Ontario, Canada; and "SIBSTAR" (available as both diblocks and triblocks with the styrene content believed to vary from about 15 to about 30 mole percent, based on the mole percent of the copolymer) from Kaneka, Osaka, Japan. Exemplary polyisobutylene resins are commercially available, for example, from under the trade designations "VISTANEX" from Exxon Chemical Co., Irving, TX; "HYCAR" from Goodrich Corp., Charlotte, NC; and "JSR BUTYL" from Japan Butyl Co., Ltd., Kanto, Japan. In general, suitable polyisobutylenes may have a wide variety of molecular weights and a wide variety of viscosities. In some embodiments, the polyisobutylene has a weight average molecular weight (as measured by Gel Permeation Chromatography using polystyrene standards) of at least about 300,000 (in some embodiments, at least about 400,000, or even at least 500,000 or more) grams per mole. In some embodiments, the polyisobutylene has a weight average molecular weight of less than 300,000 (in some embodiments, up to 280,000, 275,000, 270,000, 260,000, 250,000, 240,000, 230,000, 220,000, 210,000, or up to 200,000) grams per mole. In some embodiments, when defined by the viscosity as measured by intrinsic viscosity at □□□C in diisobutylene, the polyisobutylene has a viscosity average molecular weight in a range from 100,000 to 10,000,000 (in some embodiments, 500,000 to 5,000,000) grams per mole. Polyisobutylenes of many different molecular weights and viscosities are commercially available. In some embodiments, the molecular weight of the polyisobutylene changes during the process of making a pressure sensitive adhesive.

In some embodiments, pressure sensitive adhesives that comprise polyisobutylene, further comprises a hydrogenated hydrocarbon tackifier (in some embodiments, a poly(cyclic olefin)). In some embodiments, the hydrogenated hydrocarbon tackifier is present in a range from about 5 to about 90 percent by weight, based on the total weight of the pressure sensitive adhesive composition. In some embodiments, poly (cyclic olefin) is blended with about 10 to about 95 percent by weight polyisobutylene, based on the total weight of the pressure sensitive adhesive composition. In some embodiments, the pressure sensitive adhesive comprises a hydrogenated hydrocarbon (e.g., poly(cyclic olefin)) tackifier in a range from about 5 to about 70 weight percent, based on the total weight of the pressure sensitive adhesive composition and about 30 to about 95 weight percent polyisobutylene, based on the total weight of the pressure sensitive adhesive composition. In some embodiments, a hydrogenated hydrocarbon tackifier (in some embodiments, the poly(cyclic olefin)) is present in an amount of less than 20 (in some embodiments, less than 15) percent by weight, based on the total weight of the pressure sensitive adhesive composition. For example, the hydrogenated hydrocarbon tackifier (in some embodiments, the poly(cyclic olefin)) may be present in a range from 5 to 19.95, 5 to 19, 5 to 17, 5 to 15, 5 to 13, or even 5 to 10 percent by weight, based on the total weight of the pressure sensitive adhesive composition. In some embodiments, the pressure sensitive adhesive is free of acrylic monomers and polyacrylates. Exemplary polyisobutylene pressure sensitive adhesives include adhesive compositions comprising a hydrogenated poly(cyclic olefin) and a polyisobutylene resin such as those reported in PCT Pub. No. WO 2007/087281 (Fujita et al.), the disclosure of which is incorporated herein by reference.

Exemplary hydrogenated hydrocarbon tackifiers for the optional fourth layer are commercially available, for example, from Arakawa Chemical Industries Co., Ltd., Osaka, Japan, under the trade designations "ARKON P" and "ARKON M." These materials are described in the trade literature as being water white, hydrogenated hydrocarbon resins. Hydrogenated hydrocarbon tackifiers under the trade designation "ARKON P" (e.g., P-70, P-90, P-100, P-115, and P-140) are said to be fully hydrogenated while those under the trade designation "ARKON M" (e.g., M-90, M-100, M-115, and M-135) are partially hydrogenated. The hydrogenated hydrocarbon tackifier available under the trade designation "ARKON P-100" is said to have a number average molecular weight of about 850 grams/mole, a softening point of about 100° C., and a glass transition temperature of about 45° C. The hydrogenated hydrocarbon tackifier available under the trade designation "ARKON P-140" has a number average molecular weight of about 1250 grams/mole, a softening point of about 140° C., and a glass transition temperature of about 90° C. The hydrogenated hydrocarbon tackifier available under the trade designation "ARKON M-90" has a number average molecular weight of about 730 grams/mole, a softening point of about 90° C., and a glass transition temperature of about 36° C. The hydrogenated hydrocarbon tackifier available under the trade designation "ARKON-M-100" has a number average molecular weight of about 810 grams/mole, a softening point of about 100° C., and a glass transition temperature of about 45° C.

Other exemplary hydrogenated hydrocarbon tackifiers for the optional fourth layer are available, for example, from Exxon Chemical under the trade designations "ESCOREZ 1315," "ESCOREZ 1310LC," "ESCOREZ 1304," "ESCOREZ 5300," "ESCOREZ 5320," "ESCOREZ 5340," "ESCOREZ 5380," "ESCOREZ 5400," "ESCOREZ 5415," "ESCOREZ 5600," "ESCOREZ 5615," "ESCOREZ 5637," and "ESCOREZ 5690."

The "1300" series resins are described in the trade literature as being aliphatic resins with a high softening point. The "ESCOREZ 1315" resin is said to have a weight average molecular weight of about 2200 grams/mole, a softening point in the range of about 112° C. to about 118° C., and a glass transition temperature of about 60° C. The "ESCOREZ 1310LC" resin is said to have a light color, a weight average molecular weight of about 1350 grams/mole, a softening point of about 95° C., and a glass transition temperature of about 45° C. The "ESCOREZ 1304" resin is said to have a weight average molecular weight of about 1650 grams/mole, a softening point in the range of about 97° C. to about 103° C., and a glass transition temperature of about 50° C.

The "5300" series of resins are described in the trade literature as being water white, cycloaliphatic hydrocarbon resins, and have a weight average molecular weight in the range of about 370 grams/mole to about 460 grams/mole, a softening point in the range of about 85° C. to about 140° C., and a glass transition temperature in the range of about 35° C. to about 85° C.

The "5400" series of resins are described in the trade literature as being very light colored, cycloaliphatic hydrocarbon resins, and have a weight average molecular weight in the range of about 400 grams/mole to about 430 grams/mole, a softening point in the range of about 103° C. to about 118° C., and a glass transition temperature in the range of about 50° C. to about 65° C.

The "5600" series of resins are described in the trade literature as being very light colored, aromatic modified cycloaliphatic resins, where the percent of aromatic hydrogen atoms is in the range of about 6 to about 12 weight percent based on the weight of all the hydrogen atoms in the resins. Further, the "5600" series of resins are said to have a weight average molecular weight in the range of about 480 grams/mole to about 520 grams/mole, a softening point in the range of about 87° C. to about 133° C., and a glass transition temperature in the range of about 40° C. to about 78° C.

Other exemplary suitable hydrogenated hydrocarbon tackifiers for the optional fourth layer are available, for example, from Eastman, Kingsport, TN, under the trade designations "REGALREZ 1085," "REGALREZ 1094," "REGALREZ 1126," "REGALREZ 1139," "REGALREZ 3102," and "REGALREZ 6108." These resins are described in the trade literature as hydrogenated aromatic pure monomer hydrocarbon resins. They have a weight average molecular weight ranging from about 850 grams/mole to about 3100 grams/mole, a softening temperature in the range of about 87° C. to about 141° C., and a glass transition temperature in the range of about 34° C. to about 84° C. The "REGALEZ 1018" resin can be used in applications that do not generate heat.

This tackifying resin has a weight average molecular weight of about 350 grams/mole, a softening point of about 19° C., and a glass transition temperature of about 22° C.

Other exemplary hydrogenated hydrocarbon tackifiers are available, for example, from Cray Valley, Exton, PA, under the trade designations "WINGTACK 95" and "WINGTACK RWT-7850." The trade literature describes these tackifying resins as synthetic resins obtained by cationic polymerization of aliphatic C5 monomers. The tackifying resin available under the trade designation "WINGTACK 95" is a light yellow solid with a weight average molecular weight of about 1700 grams/mole, a softening point of 98° C., and a glass transition temperature of about 55° C. The tackifying resin available under the trade designation "WINGTACK RWT-7850" is a light yellow solid with a weight average molecular weight of about 1700 grams/mole, a softening point of about 102° C., and a glass transition temperature of 52° C.

Other exemplary hydrogenated hydrocarbon tackifiers are available, for example, from Eastman under the trade designations "PICCOTAC 6095-E," "PICCOTAC 8090-E," "PICCOTAC 8095," "PICCOTAC 8595," "PICCOTAC 9095," and "PICCOTAC 9105." The trade literature describes these resins as aromatic modified, aliphatic hydrocarbon resin or as aromatic modified C5 resins. The tackifier available under the trade designation "PICCOTACK 6095-E" has a weight average molecular weight of about 1700 grams/mole and a softening point of about 98° C. The tackifier available under the trade designation "PICCOTACK 8090-E" has a weight average molecular weight of about 1900 grams/mole and a softening point of about 92° C. The tackifier available under the trade designation "PICCOTACK 8095" has a weight average molecular weight of about 2200 grams/mole and a softening point of about 95° C. The tackifier available under the trade designation "PICCOTAC 8595" has a weight average molecular weight of about 1700 grams/mole and a softening point of about 95° C. The tackifier available under the trade designation "PICCOTAC 9095" has a weight average molecular weight of about 1900 grams/mole and a softening point of about 94° C. The tackifier available under the trade designation "PICCOTAC 9105" has a weight average molecular weight of about 3200 grams/mole and a softening point of about 105° C.

In some embodiments, the hydrogenated hydrocarbon tackifier is a hydrogenated poly(cyclic olefin) polymer. Poly(cyclic olefin) polymers generally have low moisture permeability and can impact the adhesive properties of the polyisobutylene resin, for example, by functioning as a tackifier. Exemplary hydrogenated poly(cyclic olefin) polymers include hydrogenated petroleum resins; hydrogenated terpene-based resins (e.g., available from Yasuhara Chemical, Hiroshima, Japan, under the trade designation "CLEARON," in grades P, M, and K); hydrogenated resin or hydrogenated ester-based resins (available, for example, from Hercules Inc., Wilmington, DE, under the trade designations "FORAL AX" and "FORAL 105" and from Arakawa Chemical Industries Co., Ltd., Osaka, Japan, under the trade designations "PENCEL A," "ESTERGUM H," and "SUPER ESTER A"); disproportionate resins or disproportionate ester-based resins (available, for example, from Arakawa Chemical Industries Co., Ltd., under the trade designation "PINECRYSTAL"); a hydrogenated dicyclopentadiene-based resin (e.g., a hydrogenated C5-type petroleum resin obtained by copolymerizing a C5 fraction such as pentene, isoprene, or piperine with 1,3-pentadiene produced through thermal decomposition of petroleum naphtha (available, for example, from Exxon Chemical Co., under the trade designations "ESCOREZ 5300" and "ESCOREZ 5400" and from Eastman Chemical Co., under the trade designation "EASTOTAC H")); a partially hydrogenated aromatic modified dicyclopentadiene-based resin (available, for example, from Exxon Chemical Co., under the trade designation "ESCOREZ 5600"); a resin resulting from hydrogenation of a C9-type petroleum resin obtained by copolymerizing a C9 fraction such as indene, vinyltoluene and/or methylstyrene produced by thermal decomposition of petroleum naphtha (available, for example, from Arakawa Chemical Industries Co., Ltd., under the trade designations "ARCON P" or "ARCON M"); and a resin resulting from hydrogenation of a copolymerized petroleum resin of the above-described C5 fraction and C9 fraction available, for example, from Idemitsu Petrochemical Co., Tokyo, Japan, under the trade designation "IMARV". In some embodiments, the hydrogenated poly(cyclic olefin) is a hydrogenated poly(dicyclopentadiene), which may provide advantages to the PSA (e.g., low moisture permeability and transparency).

The hydrogenated hydrocarbon tackifier generally has a solubility parameter (SP value), which is an index for characterizing the polarity of a compound, that is similar to that of the polyisobutylene and exhibits good compatibility (i.e., miscibility) with the polyisobutylene so that a transparent film can be formed. The tackifying resins are typically amorphous and have a weight average molecular weight no greater than 5000 grams/mole. If the weight average molecular weight is greater than about 5000 grams/mole, compatibility with the polyisobutylene material may decrease, tackiness may decrease, or both. The molecular weight is often no greater than 4000 (in some embodiments no greater than 2500, 2000, 1500, 1000, or even no greater than 500; in some embodiments, the molecular weight is in the range of 200 to 5000, 200 to 4000, 200 to 2000 or even 200 to 1000) grams/mole.

In some embodiments, polymeric multilayer films described herein further comprise at least one continuous (i.e., does not containing openings extending from one major surface to another major surface) layer. Exemplary continuous layers comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

Interfacial Bond Between Backing and Integrally Formed Release Liner

Special selection of materials for the backing 20 versus integrally formed release liner 40 gives rise to the constructions associated with the embodiment shown in FIG. 2 and FIG. 3.

Particularly, the material selected for the backing and the integrally formed release liner are selected so as to be "incompatible". To illustrate why this necessary, if the backing and the integrally formed release liner are the same material, they will fuse together in the co-extrusion process and become inseparable. On the other hand, certain polymer materials are considered incompatible, meaning the materials are not miscible with each other because either or both entropy and enthalpy factors are generally unfavorable at the molecular level for mixing and bonding. A blend of two polymers can be characterized as miscible or immiscible, depending on whether the polymer chains of the two components form a homogeneous single phase or phase separate into individual domains of the two components. The terminology "compatible" or "incompatible" is sometimes used in the art to describe how well the two components mix or as an assessment of their resultant properties. The term "compatible" has been used to describe blends that range from totally miscible (one phase) to interactions that are favorable and result in good physical properties. "Incompatible" usually refers to blends that have poor physical mixing properties, delaminate upon impact, or that differ greatly in viscosity, polarity, or stability. Two phase blends are often characterized as incompatible.

In traditional laminating or coating applications, artisans avoid mixing incompatible polymer materials (without additional compatibilizers), and would avoid hot melt coatings of one incompatible material to another (without some tie layer or intermediate adhesive layer), because incompatible materials exhibit poor interfacial compatibility which may lead to crack formation and de-bonding of the phases at low applied stress.

However, it has been discovered that under the right co-extrusion conditions two incompatible materials may be co-extruded as adjacent layers and will surprisingly exhibit a tendency to resist separability, where the same two dissimilar materials if married in a different context, such as a lamination operation, would not exhibit such a resistance to separability. Furthermore, because the materials are dissimilar and of high relative viscosity, they do not favor intermixing or allow for chain entanglements at the interphase, thus allowing for the materials to remain discrete and separate from one another. Even more surprisingly, these layers may be separated by peeling one away from the other, typically with manual forces, as by for example a worker applying a film in field conditions.

This 'natural bond', or tendency to resist separability between the backing and the integrally formed release liner is similar to that which could be provided by a pressure sensitive adhesive, but the bond itself is not based on an adhesive in the most basic embodiments of this disclosure. The level of adhesion between the backing and integrally formed liner is believed due to the intimate contact of the materials, brought together in a molten state, allowing the materials to be in intimate contact while not strictly being bonded together. Furthermore, low molecular weight components of the individual polymer components tend to migrate to the interphase and promoting an improved level of adhesion than that of resins without any lower molecular weight components.

Compositions of the backing and the integrally formed release liner may also be modified to provide more (or less) resistance to separation between the layers. Polymers that could serve as a tie layer to facilitate a bond between the immiscible polymer layers can also be incorporated or mixed in to either extruder used for forming the backing layer or the integrally formed release liner. When incorporated into one of the melt streams, it will at least partially migrate to the interface between the immiscible polymer streams and improve the bond between the layers. But since it was not extruded in a separate layer, it will not act as a complete compatibilizer between the immiscible layers.

Table 1 shows peel force of several pairs of incompatible materials extruded in adjacent layers using a blown film process as described below, with no intervening tie layers or adhesive layers. As may be seen, the natural tendency of adjacently oriented incompatible materials to resist separability may be chosen as a function of adjacent materials. The materials referenced in Table 1 are further described in the Examples section, as well as the test method for determining Peel Force. For the sake of this example, either of these layers may constitute either the backing or the integrally formed liner.

TABLE 1

Peel Forces Associated with Layer Pairs

| Extruder 1 Composition | Extruder 2 Composition | Peel Force - (Liner Release at 90 ipm for Backing (oz/in)) |
|---|---|---|
| PLA 4060 D | Bynel 3101/Evaloy 1609 (90/10) | 6.76 |
| PLA 4060 D | Elvaloy 1609 | 0.25 |
| PLA 4060 D | LDPE 611A | 0.07 |
| PLA 4060 D/Bynel 22E780 (80/20 wt %) | LDPE 611A | 1.10 |

The addition of compatibilizers into either the backing or the integrally formed release liner can change the peel force values between the layers by an order of magnitude at relatively low levels of additive.

Process of Making

Figure 4:
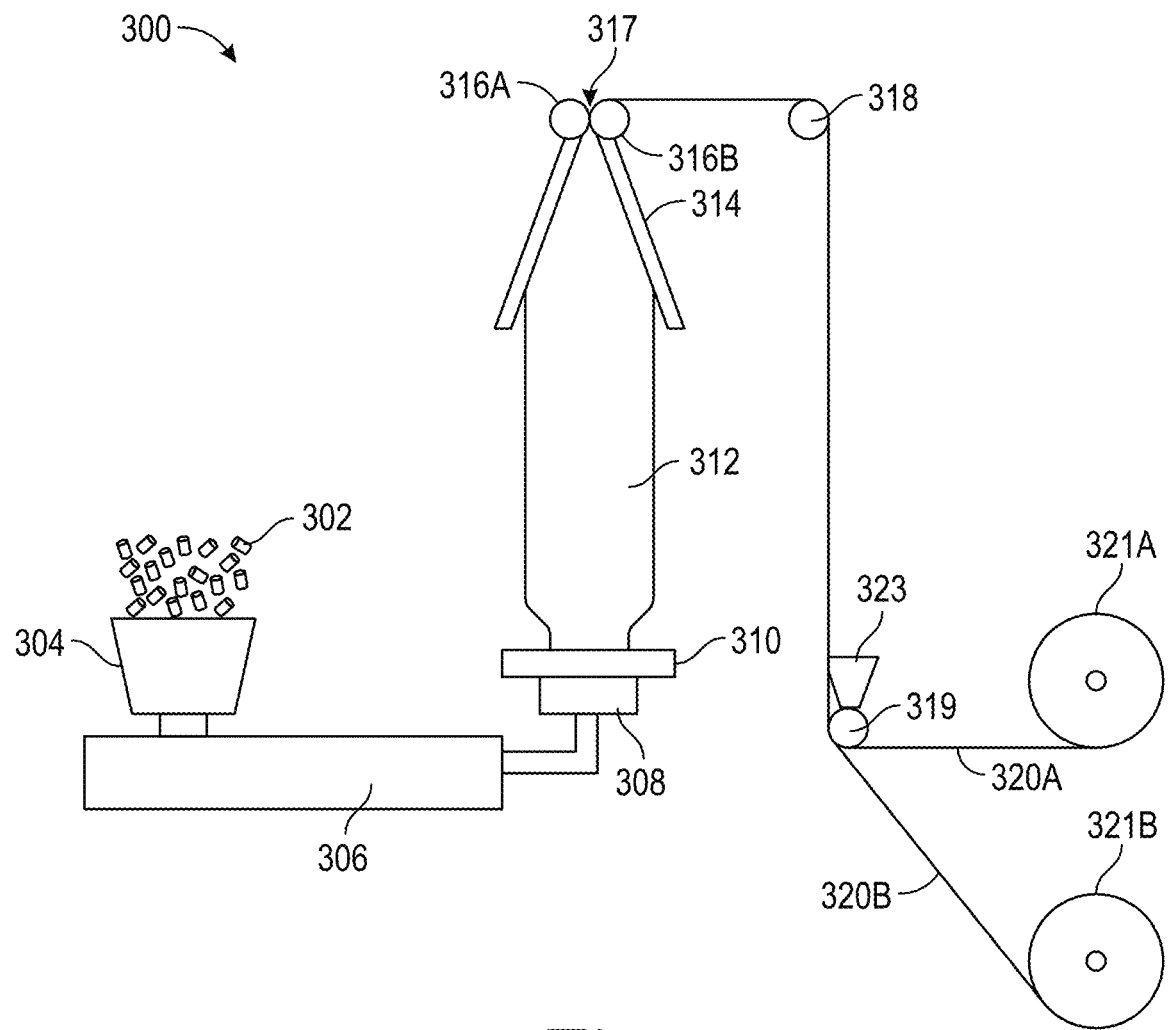
FIG. 4 is a drawing of a representative manufacturing process.
Figure 4A:
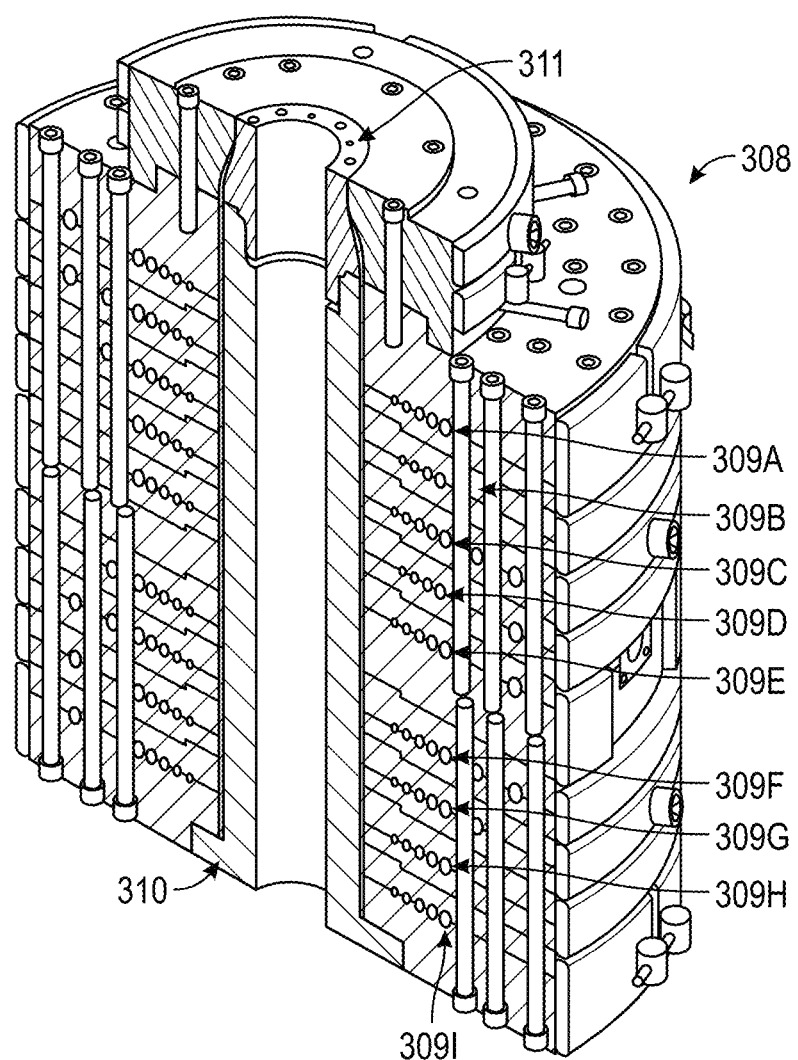
FIG. 4A is a die used in the representative manufacturing process.

In general, polymeric films having a backing with integrally formed liner can be made using a blown film process that uses an annular die to form a molten tube of film oriented radially via air pressure in a "bubble" and also pulled lengthwise in the molten area to thin the film to the final desired thickness. For example, referring to FIG. 4, apparatus 300 for making polymeric multilayer film comprising a polymeric backing with an integrally formed liner described herein includes hopper 304, extruder 306, annular die 308, air ring 310, collapsing frame 314, rollers 316A, 316B that form nip 317, slitting station 323 and idler rolls 318, 319. The backing layer and the integrally formed liner would be co-extruded adjacent one another. Referring to FIG. 4a, further details of nine layer annular die 308 are shown, including stacked die plates, with each individual die plate stack layer having machined polymer flow channels 309A, 309B, 309C, 309D, 309E, 309F, 309G, 309H, 309I. During the film making process, the molten polymer passes through the flow channels 309A, 309B, 309C, 309D, 309E, 309F, 309G, 309H, 309I and contacts central die cylinder 310 and then flows upward combining with other layers and exits annular die opening 311 to form multilayered film tube 312. The number of layers in the polymeric multilayer film can be adjusted by the number of stacking die plates in the annular die.

In operation, resin 302 (typically in the form of pellets) and other additives are added to hopper 304. Molten or otherwise flowable resin exits extruder 306 into annular die 308. Air ring 310 provides uniform air flow over the molten polymer bubble which stabilizes and aids in cooling of the polymer bubble forming circular film bubble 312 into a collapsed film tube 320 by passing through nip 317 formed by contacting nip rolls 316A and 316B. The collapsed film tube traverses idler rolls 318 and passes through slitting station 323 resulting in the formation of two flat films 320A and 320B that are passed over additional idler roll 319. Films 320A and 320B are then wound into individual rolls 321A and 321B, respectively.

Figure 5:
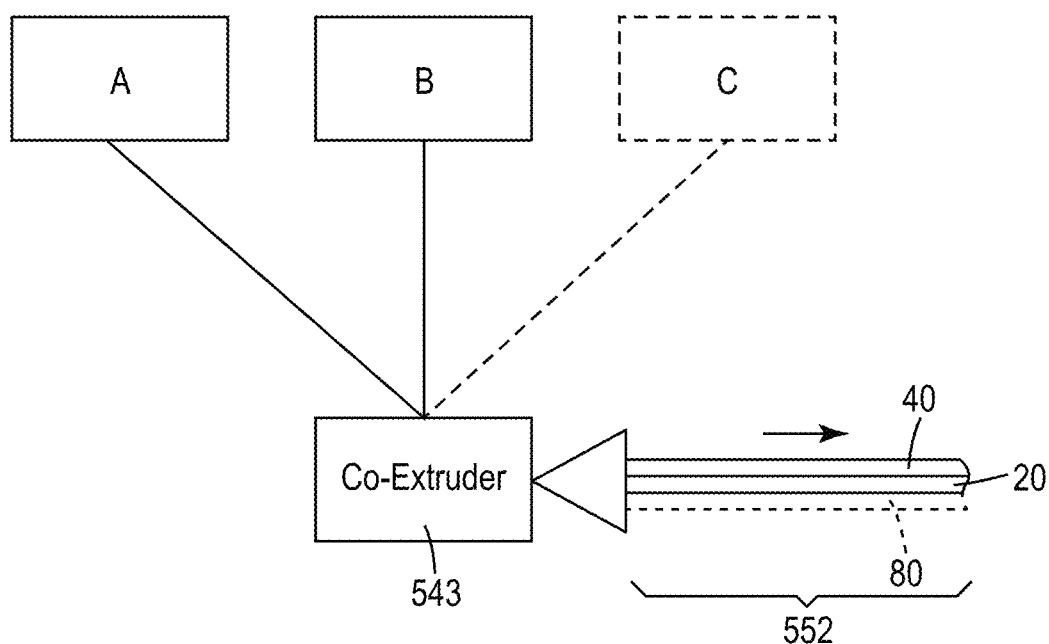
FIG. 5 is a schematic of a manufacturing method for backings with integrally formed release liners.

FIG. 5 shows a schematic of a representative manufacturing process. Hoppers contain feedstock materials: Hopper A comprises materials for a polymeric liner; hopper B comprises materials for a polymeric backing; and hopper C comprise further optional materials to be included in a resultant multilayer film. In a common co-extrusion process, the materials are co-extruded in a molten state per co-extrusion apparatus 543, which in one embodiment comprises the annular die as detailed above. Resultant multilayer film 552 having layers as described with respect to FIGS. 2 and 3 is produced, potentially stretched, slit, and wound on a roll. In one model embodiment, the process shown in FIG. 5 is part of a melt blown film manufacturing operation.

Backings having integrally formed liners as described above may also be made by casting two adjacent layers of incompatible polymer materials.

EXAMPLES

Materials Used in the Examples

| Abbreviation | Description and Source |
|---|---|
| 200-MP | Tin catalyzed silicone release polycoated kraft paper release liner, obtained under the trade designation "200MP" available from 3M Company, St. Paul, MN |
| PLA-4060D | Polylactic acid, obtained under the trade designation "INGEO BIOPOLYMER 4060D" available from Natureworks, Minnetonka, MN |
| PET-GN071 | Polyethylene terephthalate glycol-modified, obtained under the trade designation "EASTAR COPOLYESTER GN071" available from Eastman, Kingsport, TN |
| PET-14285 | Polyethylene terephthalate glycol-modified, obtained under the trade designation "COPOLYESTER 14285" available from Eastman, Kingsport, TN |
| LDPE-611A | Low density polyethylene, obtained under the trade designation "LDPE 611A" available from Dow, Midland MI |
| EVA-3101 | Ethylene vinyl acetate polymer resin, obtained under the trade designation "BYNEL 3101" available from Dupont, Wilmington, DE |
| EA-22E780 | Ethylene acrylate polymer resin, obtained under the trade designation "BYNEL 22E780" available from Dupont, Wilmington, DE |
| HDPE-DGDC | High density polyethylene, obtained under the trade designation "DGDC-2100NT 7" available from Dow, Midland MI |

-continued

| Abbreviation | Description and Source |
| --- | --- |
| G1657 | Triblock copolymer with styrene and ethylene/butylene with a polystyrene content of 13%, obtained under the trade designation "G1657 M" available from Kraton, Houston, TX |
| PL 1880G | Ethylene alpha-olefin resin, obtained under the trade designation "Affinity PL 1880G" available from Dow, Midland MI |
| ET870 | Thermoplastic polyester polyurethane elastomer, obtained under the trade designation "ET870" available from BASF Corporation, Florham Park, NJ |
| SR257 | Polypropylene random copolymer, obtained under the trade designation "PRO-FAX PP SR257M" available from Lyondellbasell, Houston, TX |
| Petrothene NA217000 | A low density polyethylene, available from Lyondellbasell, Houston, TX |
| ElvaloyAC 1609 | A copolymer of ethylene and methyl acrylate, available from Dupont, Wilmington, DE |
| Skypel G140D | A thermoplastic polyester elastomer, available from SK chemicals America, Inc, Irvine CA |
| Optema TC120 ExCo | An ethylene methyl acrylate copolymer, available from ExxonMobil, Irving, TX |
| IOA | Isooctyl acrylate, obtained from 3M, St. Paul, MN |
| AA | Acrylic acid, obtained from Alfa Aesar, Ward Hill, MA |
| IRG 651 | 2-dimethoxy-2-phenylacetophenone, onbtained under the trade designation "IRGACURE 651" available from BASF Corporation, Florham Park, NJ |
| F85 | A glycerol ester of highly hydrogenated wood rosin, available under the trade designation "FORAL 85LB" from Pinova Incorporated, Brunswick GA |
| TRIZ | 2,6-bis-trichloromethyl-6-(3,4-dimethoxyphenyl)-s-triazine available from TCI America, Portland, OR |

Example 1

Adhesive Preparation:

An adhesive transfer tape was prepared as follows. A first pressure sensitive adhesive precursor composition was prepared by mixing 99 parts pbw isooctyl acrylate (IOA), 1 pbw acrylic acid (AA) and 0.04 pbw of a photoinitiator, IRGACURE 651. This mixture was partially polymerized under a nitrogen atmosphere by exposure to low intensity ultraviolet radiation to provide a coatable syrup having a viscosity of about 4000 cps. An additional 0.26 pbw of IRGACURE 651, 0.13 pbw of a Triazine, and 6 pbw of a tackifier, FORAL 85LB, were added to the syrup and mixed until all of the components had completely dissolved to give a first pressure sensitive adhesive precursor composition.

The adhesive precursor composition was then coated to a siliconized polyethylene coated Kraft paper release liner using a notch bar with a 0.076 mm (0.003 in) gap setting greater than the thickness of the release liner. The coated liner was then exposed to an ultraviolet radiation source having a spectral output from 300-400 nanometers with a maximum at 351 nanometers in a nitrogen-rich environment. An irradiance of about 9.0 milliWatts/square centimeter was used during the exposure time, resulting in a total energy of 1800 milliJoules/square centimeter. The result was a pressure sensitive adhesive coated release liner.

Film Preparation:

A film with an integrally formed liner was prepared as follows. Two separate extruders were loaded with different polymers, the first extruder with polyethylene, LyondellBasell Petrothene NA217000 and the second extruder with polylactic acid, Natureworks Ingeo Biopolymer 4060D. A blown film annular die continuously received the two different molten raw materials and coextruded them together simultaneously through an upwards facing annular opening, as described above. The resulting film was coextruded from the die in the form of a tubular bubble with two distinct separate layers.

Liner Release Test Method:

For liner release evaluation the pressure sensitive adhesive was transfer laminated from the release liner to a stainless steel testing panel using a roller and moderate pressure. Next, the film with integrally formed liner was laminated by hand to the adhesive on the stainless steel panel such that the polyethylene side of the film covered the pressure sensitive adhesive layer. Liner separation was initiated by hand to produce a loose tab to start peel of the backing. Liner separation force was measured following the test procedures of ASTM D 3330 method D.

Example 2

Same as Example 1, except the polyethylene was replaced with DuPont Elvaloy AC 1609.

Example 3

Same as Example 1, except the polyethylene was replaced with ExxonMobil Optema TC120 ExCo.

Example 4

Same as Example 1, except the polyethylene was replaced with a blend of 90% DuPont Bynel 3101 and 10% DuPont Elvaloy AC 1609

Example 5

Same as Example 1, except the polyethylene was replaced with a blend of 80% Dow Affinity PL 1880G and Bynel 3101 (20%).

Example 6

Same as Example 1, except the polyethylene was replaced with DuPont Bynel 3101.

Example 7

Same as Example 1, except the polyethylene was replaced with Polypropylene LyondellBasell Pro-fax PP SR257M

Example 8

Same as Example 1, except the polyethylene was replaced with HDPE (DOW HDPE DGDC-2100 NT 7)

Example 9

Same as Example 1, except the polyethylene was replaced with an 80/20 blend of PLA (Natureworks Ingeo Biopolymer 4060D)/Ethylene Acrylate (Bynel 22E780) and the PLA was replaced with a low density polyethylene (Dow 611A).

Example 10

Same as Example 1, except the polyethylene was replaced with an 80/20 blend of copolyester PET-g (Eastman 14285)/Ethylene Acrylate (Bynel 22E780) and the PLA was replaced with a low density polyethylene (Dow 611A).

Example 11

Same as Example 1, except the polyethylene was replaced with an 80/20 blend of copolyester PET-g (Eastar GN071)/Ethylene Acrylate (Bynel 22E780) and the PLA was replaced with a low density polyethylene (Dow 611A).

Example 12

Same as Example 1, except the polyethylene was replaced with an 80/20 blend of PLA (Natureworks Ingeo Biopolymer 4060D)/Thermoplastic polyester elastomer (Skypel G140D) and the PLA was replaced with a low density polyethylene (Dow 611A).

TABLE 2

Liner Release Testing for Backing, wt %

| Example | Extruder 1 | | | | | | | | | | | | Extruder 2 | |
|---|---|---|---|---|---|---|---|---|---|---|---|---|---|---|
| | NA 217000 | AC 1609 | TC 120 | EVA 3101 | PL 1880G | SR257 | HDPE-DGDC | PLA-4060D | EA-22E780 | PET-14285 | PET-GN071 | G140D | PLA-4060D | LDPE-611A |
| 1 | 100 | | | | | | | | | | | | 100 | |
| 2 | | 100 | | | | | | | | | | | 100 | |
| 3 | | | 100 | | | | | | | | | | 100 | |
| 4 | | 10 | | 90 | | | | | | | | | 100 | |
| 5 | | | | 20 | 80 | | | | | | | | 100 | |
| 6 | | | | | 100 | | | | | | | | 100 | |
| 7 | | | | | | 100 | | | | | | | 100 | |
| 8 | | | | | | | 100 | | | | | | 100 | |
| 9 | | | | | | | | 80 | 20 | | | | | 100 |
| 10 | | | | | | | | | 20 | 80 | | | | 100 |
| 11 | | | | | | | | | 20 | | 80 | | | 100 |
| 12 | | | | | | | | 80 | | | | 20 | | 100 |

TABLE 3

Force to Separate Layers

| Example | Liner Release at 90 ipm for Backing (oz/in) |
|---|---|
| 1 | 0.07 |
| 2 | 0.25 |
| 3 | 6.20 |
| 4 | 6.76 |
| 5 | 0.18 |
| 6 | 0.17 |
| 7 | 0.38 |
| 8 | 0.21 |
| 9 | 0.31 |
| 10 | 1.1 |
| 11 | 0.59 |
| 12 | 5.75 |
| 13 | 0.42 |

The invention claimed is:

1. A multilayer polymeric film comprising, in the following order:
   a liner layer having a first liner surface and a second liner surface, the liner comprising a first polymer composition;
   a backing layer having a first backing surface and a second backing surface, the backing layer comprising a second polymer composition, the second polymer composition differing from the first polymer composition, wherein the liner layer and backing layer are co-extruded in a common manufacturing process, such that the first backing surface interfaces with the first liner surface, and wherein the first backing surface and the first liner surface comprise polymers or polymer blends that are incompatible with each other;
   a pressure-sensitive adhesive layer, comprising a third polymer composition, the third polymer differing from both the first polymer composition and the second polymer composition, wherein the pressure sensitive adhesive layer interfaces with the second backing surface.

2. The multilayer polymeric film of claim 1, wherein the peel force required to separate the liner layer from the backing layer is less than 7 oz/in according to ASTM D3330 method D.

3. The multilayer polymeric film of claim 1, wherein the liner layer and backing layer are in direct contact with one another, without intervening tie layers or adhesives.

4. The multilayer polymeric film of claim 1, wherein the backing layer comprises further layers.

5. The multilayer polymeric film of claim 4, wherein the pressure-sensitive adhesive layer is also co-extruded in the common manufacturing process.

6. The multilayer polymeric film of claim 1, and further comprising a release layer coupled to the second liner surface.

7. The multilayer polymeric film of claim 6, wherein the polymeric film is self-wound on a roll, and wherein an interface adherence between the backing and the release layer is lower than an interfacial adherence between the liner layer and the backing layer.

8. The multilayer polymeric film of claim 1, wherein the second liner side of the liner layer includes a release coating.

9. The multilayer polymeric film of claim 8, wherein the multilayer polymeric film comprises a flashing tape for sealing around seams in residential or commercial building applications.

10. The multilayer polymeric film of claim 1, wherein the liner layer is hand separable from the backing layer.

11. The multilayer polymeric film of claim 1, wherein the coextrusion comprises a blown film extrusion process.

12. The multilayer polymeric film of claim 1, wherein the co-extrusion comprises is manufactured by a cast film process.

13. A flashing tape comprising:

a liner layer having a first liner surface and a second liner surface, the liner comprising a first polymer composition;

a backing layer having a first backing surface and a second backing surface, the backing layer comprising a second polymer composition, the second polymer composition differing from the first polymer composition, wherein the liner layer and backing layer are co-extruded in a common manufacturing process, such that the first backing surface interfaces with the first liner surface, and wherein the first backing surface and the first liner surface comprise polymers or polymer blends that are incompatible with each other;

a pressure-sensitive adhesive layer, comprising a third polymer composition, the third polymer differing from both the first polymer composition and the second polymer composition, wherein the pressure sensitive adhesive layer interfaces with the second backing surface.

* * * * *